Figure 1:
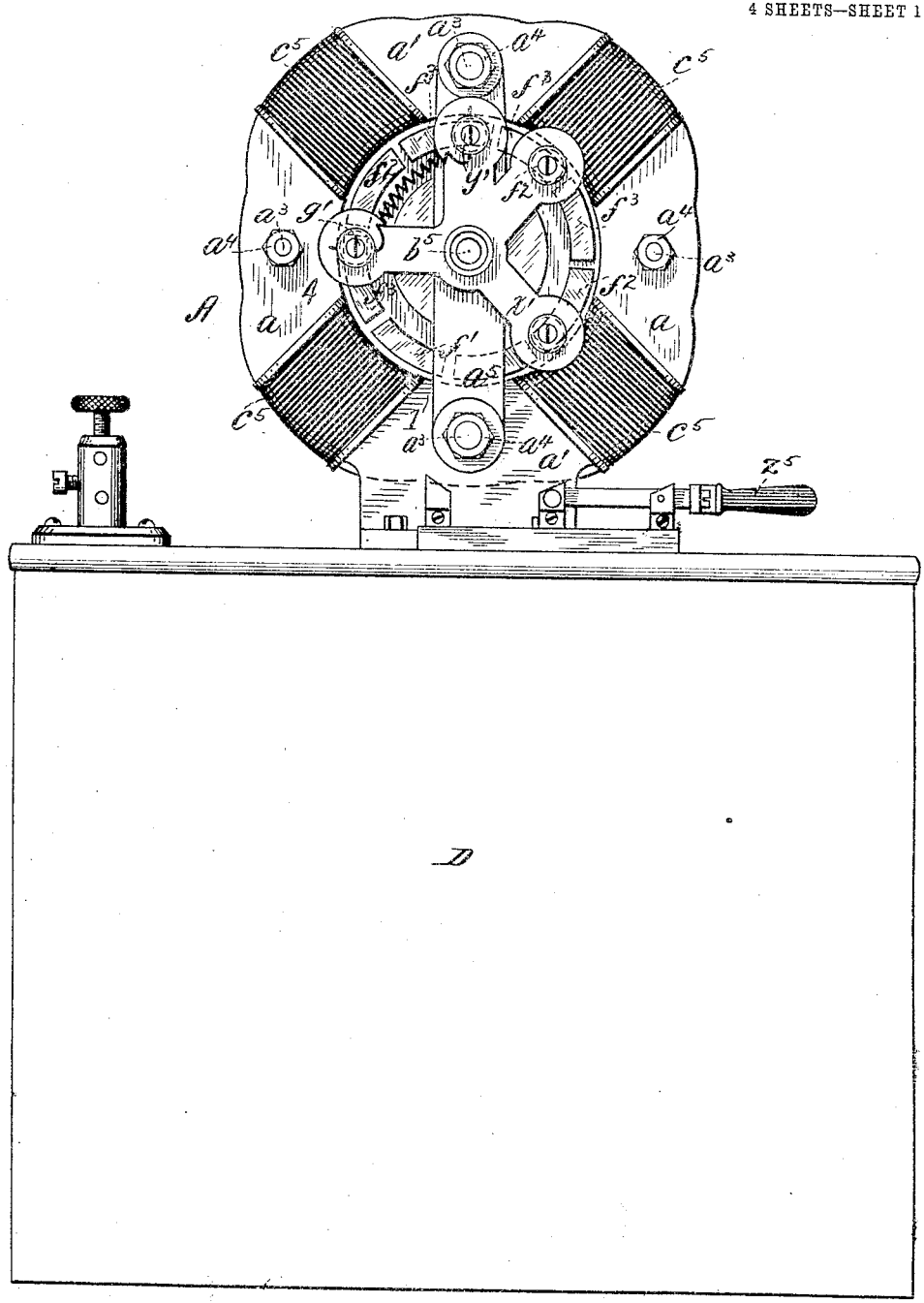

No. 823,495. PATENTED JUNE 12, 1906.
J. O. HEINZE, Jr.
ALTERNATING CURRENT MOTOR.
APPLICATION FILED MAY 29, 1905.

4 SHEETS—SHEET 1.

Witnesses: Inventor:

No. 823,495. PATENTED JUNE 12, 1906.
J. O. HEINZE, Jr.
ALTERNATING CURRENT MOTOR.
APPLICATION FILED MAY 29, 1905.

4 SHEETS—SHEET 2.

Witnesses: Inventor:

No. 823,495. PATENTED JUNE 12, 1906.
J. O. HEINZE, Jr.
ALTERNATING CURRENT MOTOR.
APPLICATION FILED MAY 29, 1905.

4 SHEETS—SHEET 4.

Witnesses:

Inventor:
John Otto Heinze, Jr.
by his attorney
Charles F. Richardson

UNITED STATES PATENT OFFICE.

JOHN OTTO HEINZE, JR., OF LOWELL, MASSACHUSETTS.

ALTERNATING-CURRENT MOTOR.

No. 823,495. Specification of Letters Patent. Patented June 12, 1906.

Original application filed July 22, 1903, Serial No. 166,621. Divided and this application filed May 29, 1905. Serial No. 262,771.

*To all whom it may concern:*

Be it known that I, JOHN OTTO HEINZE, Jr., a citizen of the United States, residing at Lowell, in the county of Middlesex and State of Massachusetts, have invented certain new and useful Improvements in Alternating-Current Motors, of which the following is a specification.

My invention relates to alternating-current motors. Its principal object is to provide a motor whereby the alternating current of a generator not only operates the motor when synchronous with said current, but starts the armature from a state of rest and accelerates the speed of the armature until the secondary circuit is opened and closed and placed in series with the primary circuit in succession during each alteration of the current.

My invention consists in so designing the field, armature, and commutating mechanisms that when the coils of the armature-poles are under those of the field, but slightly in advance thereof, the poles of said armature and said field are, while each coil is in an active magnetic field, of like kind or kinds, the poles of said armature and said field repelling each other; but when said armature-coils have moved into and beyond neutral magnetic positions midway between the adjacent field-poles then all said poles become of opposite kind or kinds and attract each other until those of the armature begin to lead those of the field, at which moment said armature-poles become like those of the field, and the armature moves on to the next pole, as above described. To accomplish this result, I employ a primary circuit and a secondary circuit for the field and armature or for armature and field, respectively. When the poles of the armature lead those of the field, the coils of the secondary are short-circuited and have inverse currents induced therein by the coils of the primary, repulsion takes place between the poles of the armature and the field, and the armature moves on toward the next field-poles. When the poles of the armature are midway between those of the field, the secondary circuit is placed in series with the primary circuit, an attraction begins between the armature and field poles, and the armature is drawn forward until, as above described, the secondary is again short-circuited and cut out of the primary circuit, the alternating current continuously flowing through the primary circuit. The principle involved in this feature of my invention is to cause, during one or more alterations of said current passing through the primary circuit, the secondary circuit to be short-circuited in an active magnetic field, the coils of secondary leading those of the primary, and then, when said primary and said secondary circuits occupy neutral magnetic positions in relation to each other, to open said secondary circuit and place it in a series with said primary circuit.

Figure 2:
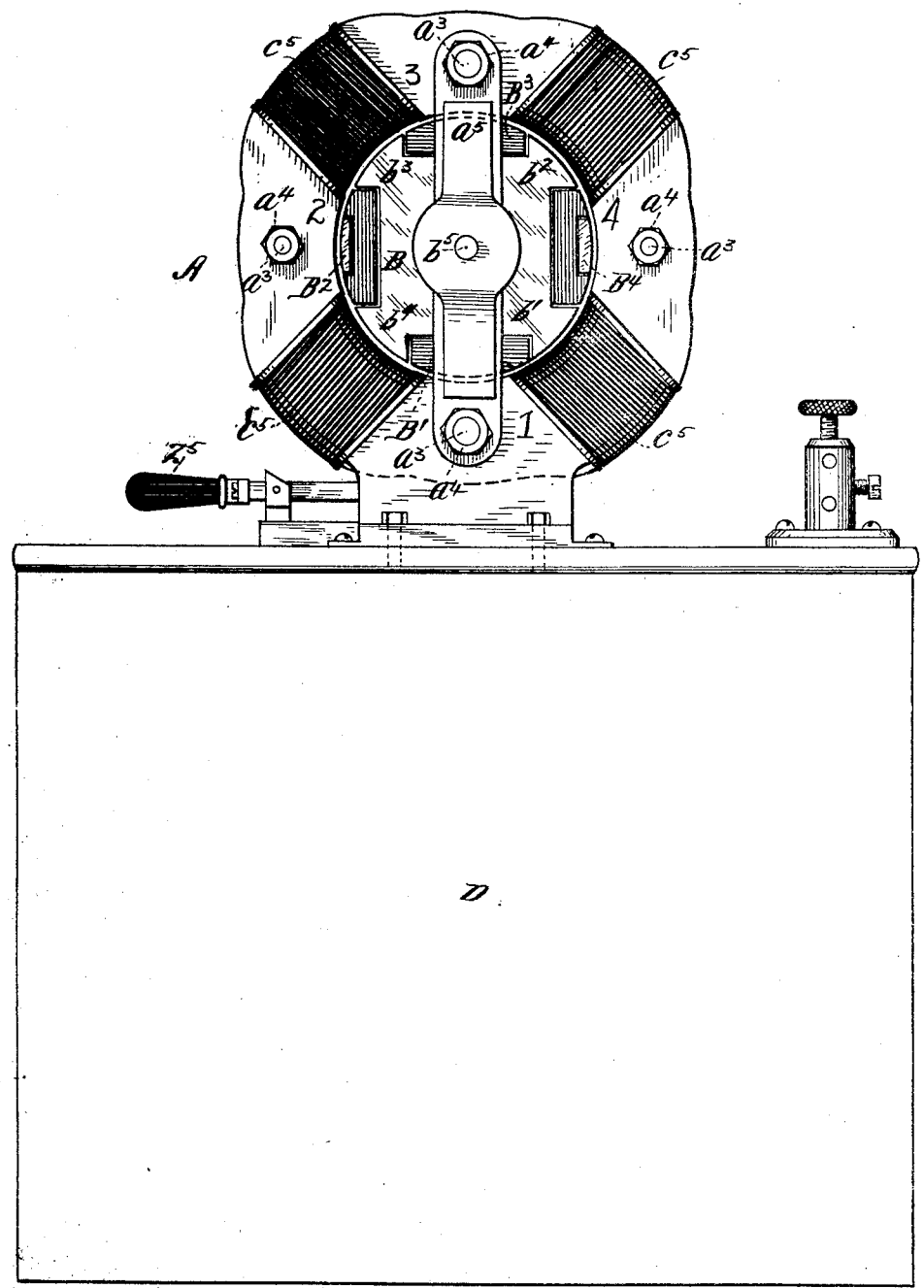
Figure 3:
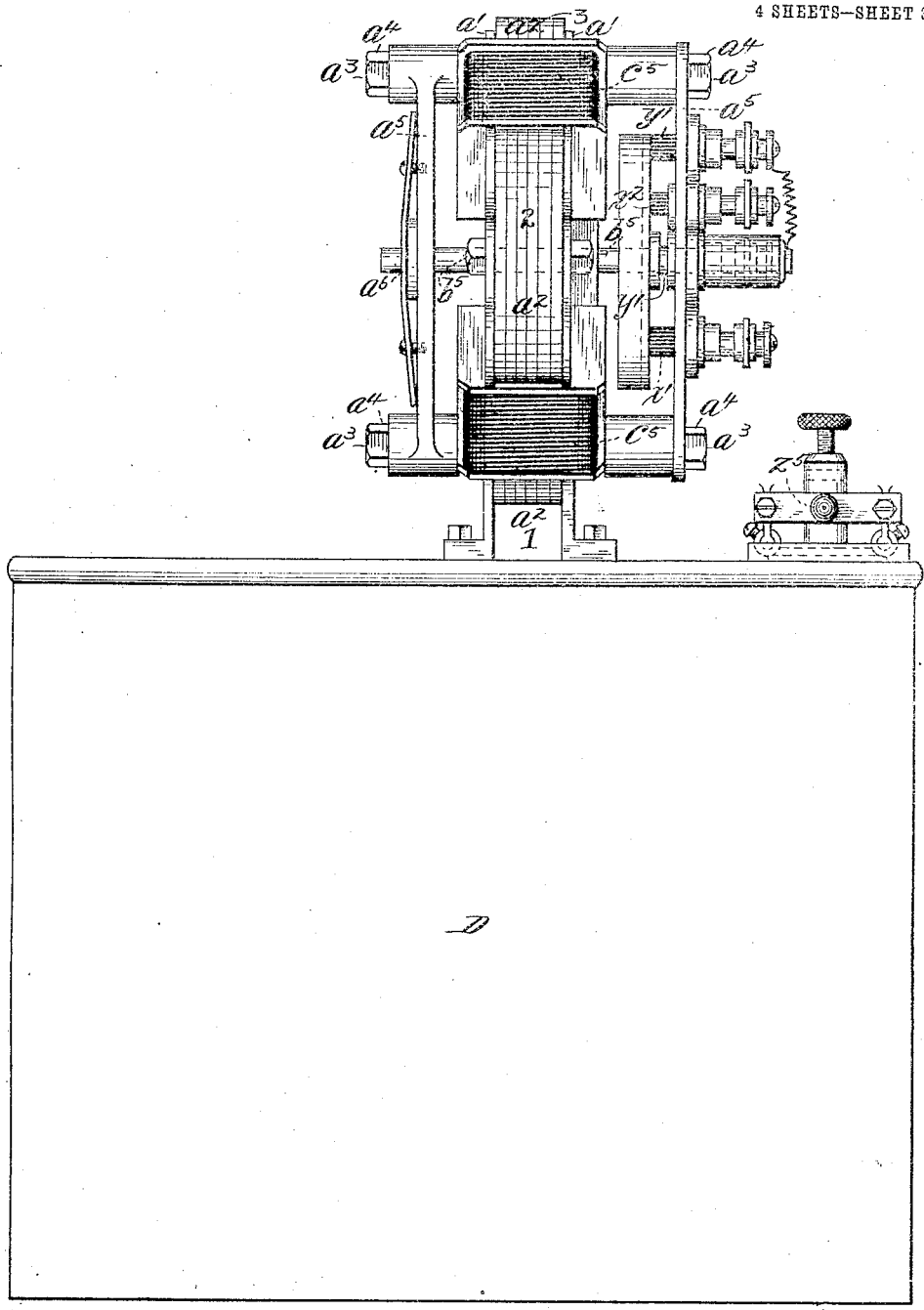
Figure 4:
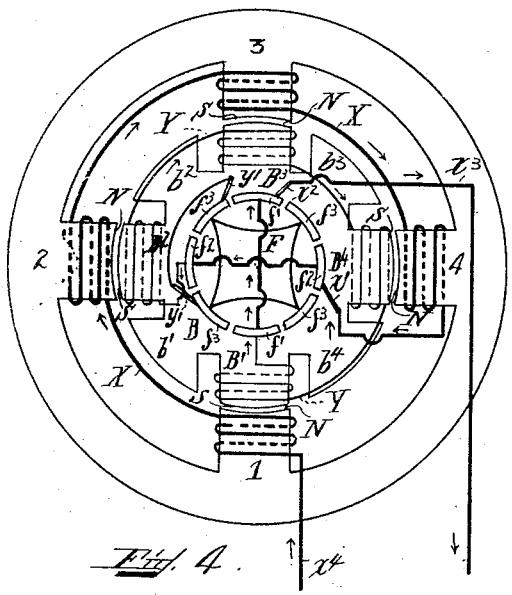
Figure 6:
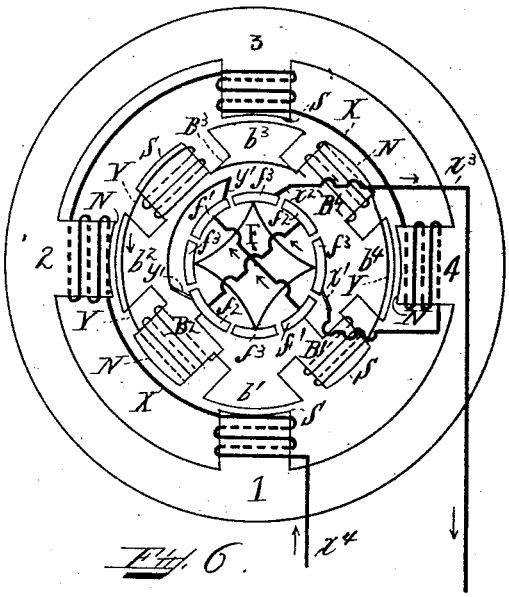

Figure 1 is a front elevation of my invention. Fig. 2 is a rear elevation, and Fig. 3 is an end elevation. Fig. 4 shows diagrammatically the wiring of said motor, while Fig. 5 shows wiring for a modified form of motor; and Figs. 6 and 7 point out the changes in the relative positions of brushes, commutators, and wiring when the armatures in Figs. 4 and 5, respectively, have advanced through an angle of forty-five degrees.

Referring to Figs. 1, 2, and 3 of the drawings, I have shown a circular frame A, supporting fixed electro field-magnets 1 2 3 4, having inward poles, and an armature B, provided with a series of electromagnetic poles $B' B^2 B^3 B^4$ and intervening short-circuited masses $b' b^2 b^3 b^4$, said armature B rotating between said field-magnets 1 2 3 4. Frame A is securely mounted, as upon the top of a wooden box D. It comprises two parallel vertical ring-shaped metal plates $a'$ $a^2$, between whose adjacent faces are laminated metal rings $a^3$, tightly clamped together by threaded bolts $a^3$ and nuts $a^4$ therefor, and two laterally-projecting brackets $a^5$ $a^5$, sustained by a pair of said bolts and containing the journal-bearings $a^6 a^6$ for the armature-shaft $b^5$.

The pole-pieces of the field-magnets 1 2 3 4 (see Fig. 4) are wound by a simple winding of insulated wire in the primary circuit X, the winding of each succeeding pole-piece being in a direction opposite to that of the former. The armature pole-pieces of the electromagnets $B' B^2 B^3 B^4$ are likewise wound in series by a single winding of insulated wire in the secondary circuit Y Y, the winding of each succeeding pole-piece being opposite to that of the preceding pole-piece. The commutator F comprises a series of eight segments $f' f^2 f' f^2 f' f^2 f' f^2$ forty-five degrees apart, four alternating segments $f' f' f' f'$ being in circuit with the secondary Y, while the remaining four segments $f^3 f^3 f^3 f^3$ are in circuit with each other. Two pairs of brushes $y' y' x'$ $x^2$ are in sliding engagement with these segments—one pair $y' y'$ electrically connected to close and open the secondary Y and the other pair $x' x^2$ to close and open the primary X and the secondary Y to place them in and out of series and to short-circuit the primary X—one brush $x'$ connecting the free end of the winding of the primary about the pole-pieces of the field and the other brush $x^2$ connecting with that portion of the primary conductor $x^3$ leading to the source of electricity. These brushes are so adjusted with reference to the segments of the commutator that the disengagement and engagement between each pair of brushes and its respective segments take place when the pole-pieces of the armature begin to lead those of the field and also when the axes of the armature-poles have moved through an arc of forty-five degrees.

Figure 5:
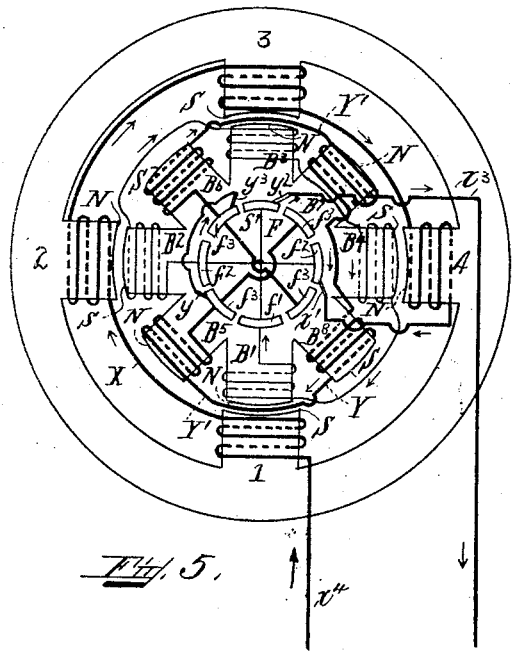

The construction and operation of the apparatus shown in Figs. 1, 2, and 3 will be more easily understood if reference is made to the diagrammatic views shown in Figs. 4 and 5 and if the course of an alternating current through the motor and its effect upon the apparatus so far described are noted. Assuming one phase of the main current is flowing in the primary circuit X in the direction indicated by the arrows, it causes the poles of the electro field-magnets 1 2 3 4 to become S N S N, respectively shown, and by continuing on through the brush $x'$, the segments $f^2 f^2$ of the commutator F, through the coils $B^2 B^3 B^4 B'$ of the secondary circuit Y, the commutator-segments $f' f'$, the brush $x^2$, and the leading-out wire $x^3$, the poles of the armature have polarities N S N S opposite in kind to those of the poles of the field. As the magnetic axes of all the poles of the field and armature are coincident, there is no tendency on the part of the armature to move; but when for the purpose of starting the motor the poles of the armature are moved, as by hand, to the left, and therefore lead those of the field, the brushes $x' x^2$ slide out of engagement with the segments $f' f^2$ (shown in Fig. 4) and into engagement with said segments $f^3 f^3$. (Shown in Fig. 6.) At this moment of engagement the main primary current in X instead of passing through the coils of the secondary Y passes through the electrically-connected segments $f^3 f^3$ and off through the leading-out wire $x^3$ of the primary circuit X to the source of the electrical energy; but at said moment the brushes $y' y'$ engage the segments $f' f^2$ and the coils of the secondary Y are short-circuited and have induced therein by the coils of the primary circuit inverse-currents that cause the poles of the armature to become the same in kind as those of the field, and said poles are therefore repelled. The armature begins to move. If there are two or more phases of the current before said armature moves through forty-five degrees, the poles of the field and armature are always of the same kind, both being S or N. Hence they always repel each other. Now while the armature-poles are moving out of the magnetic fields and are being repelled less and less the closed circuiting metal masses $b' b^2 b^3 b^4$ are moving into said field, and thus more and more facilitate the flow of the magnetic currents between the adjacent poles of the field. When the armature has passed through an arc of forty-five degrees, the brushes $y' y'$, short-circuiting the secondary Y, slide on to the short-circuiting segments $f^3 f^3$ of the commutator and the brushes $x' x^2$ engage the segments $f^2 f'$ and allow the main current again to flow through the secondary Y, as above described, the poles of the electro field-magnets 1 2 3 4 and the poles of the electro armature-magnets $B^2 B^3 B^4 B'$, respectively, of the armature all being unlike in kind, and therefore attracting each other more and more until the magnetic axes of the poles of the field and armature coincide, when the secondary is again short-circuited and the armature-poles are repelled in the manner already pointed out. The movement of the armature increases in speed and continues to increase up to the point where the changes in the poles of the armature and those of the field are in synchronism with the phases of the alternating current. If perchance the armature should tend to get ahead of a phase of the current—that is, should move more than ninety degrees during one phase of the current—then the induced current in the secondary becomes minimized and reduces the torque, and the armature repulsion between like poles falls back on its phase.

The operation of the motor has now been explained.

Figure 7:
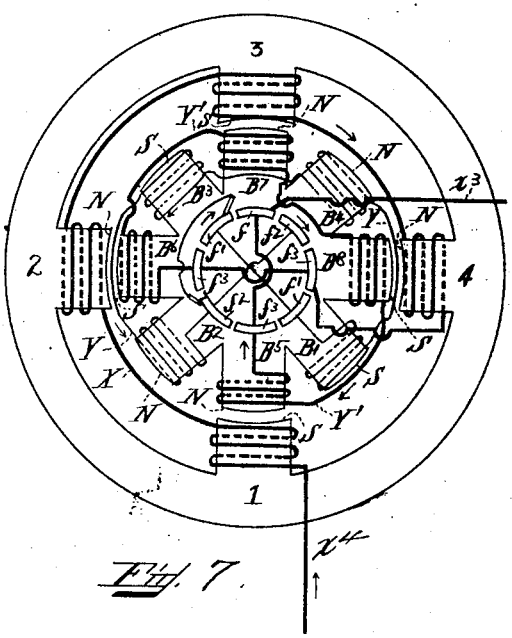

In Figs. 5 and 7 I have shown a modified form of armature. In place of the intervening short-circuited masses $b' b^2 b^3 b^4$ I have substituted four additional pole-pieces $B^5 B^6 B^7 B^8$, wound by a single insulated wire to form a second secondary circuit Y', wound like the secondary circuit Y, above mentioned, and connected through the segments $f^3 f^3$ of the commutator F to short-circuit itself and through segments $f^3 f^3 f^3 f^3$ to the primary circuit X, and place said primary circuit X in series with said second secondary circuit Y'. By this construction the main primary current instead of flowing through only the segments $f^3 f^3$ of the armature when the first secondary is short-circuited, as in Fig. 6, flows through said second secondary coils, they being in series with those of the field. In fine, the primary circuit X is always in series with either the first secondary Y or the second secondary Y', and that secondary which is not in series is short-circuited. This is an economical form of construction in that all the electrical energy of the primary current is utilized.

Fig. 7 shows the direction of the currents and poles when the modification shown in Fig. 5 is moved through an angle of forty-five degrees.

While I have shown the primary circuit as energizing the field and the secondary as mounted on the armature, it will be too plain to require further description and illustration that there may be a reversal—that is, the primary circuit may be used to energize the armature and the secondary confined to the field by simply changing the relations of circuits, brushes, and commutators—a problem readily understood and solved by skilled electricians.

The above-described synchronous alternating-current motor being described, but not claimed, by me in my application for United States Letters Patent No. 166,621 and filed July 22, 1903, and desiring to protect said motor in the broadest manner legally possible,

What I claim is—

1. A synchronous alternating motor, made up of a stationary member; a movable member; a field-circuit; an armature-circuit; means whereby said field-circuit may be connected in series with said armature-circuit, said motor, while said circuits are connected in series, operating as a series motor; and means whereby said armature-circuit may be closed upon itself to form a secondary circuit, said secondary circuit being acted upon inductively by said field or primary circuit; said closing of the armature-circuit to form the secondary circuit, taking place when the magnetic axes of the coils of the primary and secondary circuits are one and the same, and said connection of the armature-circuit and the field-circuit in series, taking place when the coils of the field and the coils of the armature are in neutral magnetic relations.

2. A synchronous alternating-current motor, made up of a stationary member; a movable member; a field-circuit; armature-circuits; means whereby said field-circuit may be connected in series with one of said armature-circuits; said motor, while said circuits are connected in series, operating as a series motor; and means whereby the other of said armature-circuits is closed upon itself and forms a secondary circuit, said secondary circuit being acted upon inductively by said primary circuit; said connection in series taking place when the coils of one of said armature-circuits are in neutral magnetic relations with said field-coils, and at said time, said other armature-circuit is closed upon itself and is in active relation with said field-circuit, so that said armature-circuits will with said field-circuit simultaneously form a primary circuit, and a secondary circuit; said motor operating simultaneously both as an induction-motor and as a series motor.

3. A synchronous alternating-current motor, made up of a field of electromagnets in a primary circuit; a rotatable armature, provided with electromagnets in a secondary circuit; a series of commutator-segments, mounted upon the armature-shaft; a pair of electrically-connected brushes, to engage the segments in the secondary circuit, to open and close said secondary circuit; and a pair of brushes in the primary circuit, to engage said segments in the secondary circuit, to connect said primary circuit and said secondary circuit in series; and a series of segments in circuit with which said brushes may engage to complete the primary circuit; said short-circuiting taking place when the magnetic axes of the coils of the primary circuit, and the coils of the secondary circuit, are one and the same; and said connection in series occurring when the coils of the primary circuit, and the coils of the secondary circuit, are in neutral magnetic positions.

In testimony whereof I affix my signature in presence of two witnesses.

JOHN OTTO HEINZE, Jr.

Witnesses:
F. J. U. DAKIN,
E. F. UNIAC